3,179,655
PURIFICATION OF ETHYLENIMINES BY AZEOTROPIC DISTILLATION
James E. Cobb, Bessemer, Ala., assignor to The Dow Chemical Company, Midland, Mich., a corporation of Delaware
No Drawing. Filed Dec. 20, 1961, Ser. No. 160,892
6 Claims. (Cl. 260—239)

This invention relates to methods for separating ethylenimine (hereinafter referred to as EI) from mixtures thereof with other materials.

In the production and utilization of EI, the latter is frequently contaminated with other substances the separation of which is difficult or impossible by ordinary methods. This difficulty is often due to the great reactivity of EI and its ease of polymerization and to the fact that many substances which do not react directly with EI are effective catalysts for its reaction with other materials. Thus, in the production of EI by the amination of ethylene chloride with ammonia it is necessary to separate the EI from unreacted ethylene chloride as well as from aqueous solutions of salts. The ethylene chloride, as well as the amine hydrochlorides and ammonium chloride that are usually present are potent catalysts for the polymerization and/or amination of EI, thus favoring the conversion of the EI to ethylenediamine or polymers thereof.

According to the invention, EI is separated from mixtures of EI with water, NaCl, $NH_4Cl$, ethylene chloride, amine hydrochlorides, and the like, by adding a saturated aliphatic hydrocarbon having a boiling point of about 50–80° C. and distilling the EI-hydrocarbon azeotrope from the mixture. For many purposes, this azeotrope can be used directly for its EI content. When the EI is desired in pure form, free of hydrocarbon, it can be separated by extraction with water and recovery from the resulting aqueous solution by distillation. Only a little water need be added to the azeotrope to cause the latter to separate into two phases, a hydrocarbon phase containing little EI, which phase can be recycled to the process, and an aqueous EI phase which can be used as much or can be separated into its components by distillation.

The azeotroping agent can be any inert material which has a suitable boiling point and forms an azeotrope with EI. The preferred material is a saturated aliphatic hydrocarbon having a boiling point of about 50–80° C. It may be a pure compound, such as hexane for instance, or a petroleum fraction of suitable boiling range. The boiling point and composition of the azeotrope depend on the choice of azeotroping agent. Among the aliphatic hydrocarbons, the percentage of EI in the azeotrope is usually higher with the higher-boiling hydrocarbons. Likewise, the boiling point of the azeotrope is higher with such hydrocarbons. It is desirable to distill the azeotrope at a relatively low temperature, preferably about 40–80° C., and if the hydrocarbon boils above about 80° C. the still-pot temperature in the distillation is likely to exceed this preferred range. In view of these opposing considerations, the preferred hydrocarbons are those corresponding to the hexane fraction of petroleum; i.e., those boiling in the range of about 60–70° C.

The practice of the invention is illustrated by the following examples.

*Example 1*

A sample of EI containing about 3% by weight of ethylene chloride, when fractionally distilled at atmospheric pressure was largely converted to polymers of EI. When mixed with about 12 volumes of hexane (B.P., 68–70° C.) and then fractionally distilled it yielded no polymer, the EI being distilled as a hexane azeotrope boiling at 44.5–46.0° C. and containing 36.8% of EI by weight.

*Example 2*

A mixture of 18.2 ml. of EI and 28.0 ml. of ethylene chloride could not be distilled at atmospheric pressure because the EI polymerized when the mixture was heated to the boiling point. When 200 ml. of hexane (B.P., 68–70° C.) was added to such a mixture the EI-hexane azeotrope was distilled at 45–46° C. and contained 38.8% EI. Recovery of EI was substantially quantitative.

In a manner similar to that described above, EI can be azeotropically distilled and recovered from mixtures of EI and such reactive compounds as benzyl chloride, alkyl chlorides, and the like.

I claim:
1. The process comprising adding to a composition comprising ethylenimine at least about two volumes, based on the ethylenimine, of a saturated aliphatic hydrocarbon boiling between about 50° and 80° C. and distilling an ethylenimine-hydrocarbon azeotrope from the resulting mixture.
2. The process defined in claim 1 wherein the hydrocarbon is essentially hexane.
3. The process defined in claim 1 wherein the composition contains ethylene chloride.
4. The process for separating ethylenimine from a mixture containing ethylenimine and at least one of the substances $H_2O$, NaCl, $NH_4Cl$, ethylene chloride and amine hydrochloride, said process comprising adding to said mixture at least two volumes, based on the ethylenimine, of a saturated aliphatic hydrocarbon boiling between 50° and 80° C. and distilling an ethylenimine-hydrocarbon azeotrope from the resulting mixture.
5. In the process for making ethylenimine by the reaction of ethylene chloride with ammonia wherein the ethylenimine and ethylene chloride are present in the reaction product, the step of separating the ethylenimine from the reaction product by mixing with said product at least two volumes, based on the ethylenimine, of a saturated aliphatic hydrocarbon boiling between 50° and 80° C. and distilling an ethylenimine-hydrocarbon azeotrope from the resulting mixture.
6. The process defined in claim 5 wherein the hydrocarbon is essentially hexane.

References Cited by the Examiner
UNITED STATES PATENTS

| | | |
|---|---|---|
| 2,410,642 | 11/46 | Farkas et al. |
| 2,423,545 | 7/47 | Aeschbach. |
| 2,463,629 | 3/49 | Karr. |
| 2,609,336 | 9/52 | Bruner et al. |
| 2,636,880 | 4/53 | Reeves et al. |
| 2,809,912 | 10/57 | Birum. |
| 3,003,929 | 10/61 | Bright. |

GEORGE D. MICHELL, *Primary Examiner.*
NORMAN YUDKOFF, ALPHONSO D. SULLIVAN, *Examiners.*